(12) United States Patent
Thaler et al.

(10) Patent No.: US 8,790,805 B2
(45) Date of Patent: Jul. 29, 2014

(54) BATTERY UNIT

(75) Inventors: Alex Thaler, Graz (AT); Ralph Wüñsche, Graz (AT)

(73) Assignee: MAGNA STEYR Battery Systems GmbH & Co OG, Graz (AT)

(*) Notice: Subject to any disclaimer, the term of this patent is extended or adjusted under 35 U.S.C. 154(b) by 265 days.

(21) Appl. No.: 13/319,694

(22) PCT Filed: May 11, 2010

(86) PCT No.: PCT/EP2010/056506
§ 371 (c)(1),
(2), (4) Date: Nov. 10, 2011

(87) PCT Pub. No.: WO2010/130760
PCT Pub. Date: Nov. 18, 2010

(65) Prior Publication Data
US 2012/0148887 A1    Jun. 14, 2012

(30) Foreign Application Priority Data

May 11, 2009   (DE) .......................... 10 2009 020 787

(51) Int. Cl.
*H01M 2/36* (2006.01)

(52) U.S. Cl.
USPC ......................................................... 429/72

(58) Field of Classification Search
None
See application file for complete search history.

(56) References Cited

U.S. PATENT DOCUMENTS

| | | | |
|---|---|---|---|
| 5,424,143 A * | 6/1995 | Shrim | 429/405 |
| 5,756,227 A * | 5/1998 | Suzuki et al. | 429/62 |
| 2008/0090137 A1* | 4/2008 | Buck et al. | 429/120 |
| 2009/0208829 A1* | 8/2009 | Howard et al. | 429/120 |

FOREIGN PATENT DOCUMENTS

| | | |
|---|---|---|
| DE | 102008016936 A1 | 10/2008 |
| DE | 102007050400 A1 | 4/2009 |

* cited by examiner

*Primary Examiner* — Patrick Ryan
*Assistant Examiner* — Jose Colucci Rios
(74) *Attorney, Agent, or Firm* — Jordan IP Law, LLC; Todd A. Vaughn

(57) ABSTRACT

A battery unit with a stack of flat cells, with cooling sheets between adjacent cells. The cooling sheets at an upper end thereof have at least one bended edge, with the edges of adjacent cooling sheets being aligned spatially in the same direction. The bended edges of adjacent cooling sheets partially overlap in order to form die gaps which are also aligned spatially in the same direction.

20 Claims, 2 Drawing Sheets

BATTERY UNIT

CROSS-REFERENCE TO RELATED APPLICATIONS

The present application is a National Stage Application of PCT International Application No. PCT/EP2010/056506 (filed on May 11, 2010), under 35 U.S.C. §371, which claims priority to German Patent Application No. 10 2009 020 787.2 (filed on May 11, 2009), which are each hereby incorporated by reference in their respective entireties.

FIELD OF THE INVENTION

The present invention relates to a battery unit that contains a plurality of flat cells which are stacked, between which metal sheets are placed. Each metal sheet has at least one angled edge.

BACKGROUND OF THE INVENTION

A similar battery unit is, for example, described in DE 10 2008 016 936 A2. There, the edges of the metal cooling sheets are bent at 90 degrees in order to cover the cells in a form-fitting way and to thereby provide a connection to a heat sink.

Battery units of this type can create levels of pressure inside the cells through overheating, short circuits, or other electrical incidents that cause the cells to burst and subsequently leak the gas that was created in the cells. This process can even lead to the formation of flames. If the flames spread to an adjacent cell, that cell may also overheat, resulting in a chain reaction that can pose a serious safety risk.

SUMMARY OF THE INVENTION

The invention relates to a battery unit having a plurality of flat cells which are stacked such that inside the battery unit the respective cells are better protected against gas leaks and flames.

The invention relates to such a battery unit further including adjacent metal cooling sheets having their edges angled spatially in the same direction. Furthermore, these edges partially overlap in order to form die gaps, which are aligned spatially in the same direction.

Due to the aforementioned design features of the invention, any gas escaping from a cell is deflected to the side and diverted away from any adjacent, and any opposite cells, so that these cells are effectively protected from the gases or flames emanating from a single faulty cell. Such a design also serves to reduce the risk of a chain reaction and, as a result, enables the production of low-cost battery units with considerably enhanced levels of operating safety.

In accordance with embodiments of the invention, the angle of the bend is preferably greater than or equal to 45 degrees and less than 90 degrees. Most preferably, the angle is between about 70 degrees and 85 degrees in order to form a die gap that points as far as possible laterally.

When the battery unit is situated next to at least two adjacent stacks of cells, then the edges inside the battery unit are aligned spatially in the same direction, especially if viewed in three dimensions, in order to protect the respectively opposite stack. In a particular variation of the invention, when the battery unit has at least two adjacent stacks of cells, edges that are opposite to each other in the battery unit are angled spatially in the same direction or in a mirror-symmetric way in order to protect the respectively opposite stack.

Furthermore, the edge design of the present invention creates the possibility to curl the metal cooling sheets in an area close in spatial proximity to the edges, so that the cells are protected against slipping towards the edges, which constitutes an additional preferable feature of the invention.

BRIEF DESCRIPTION OF THE DRAWINGS

The invention is described in more detail in the enclosed figures and drawings, which present an implementation example. The drawings demonstrate.

DETAILED DESCRIPTION OF EMBODIMENTS

Figure 1:
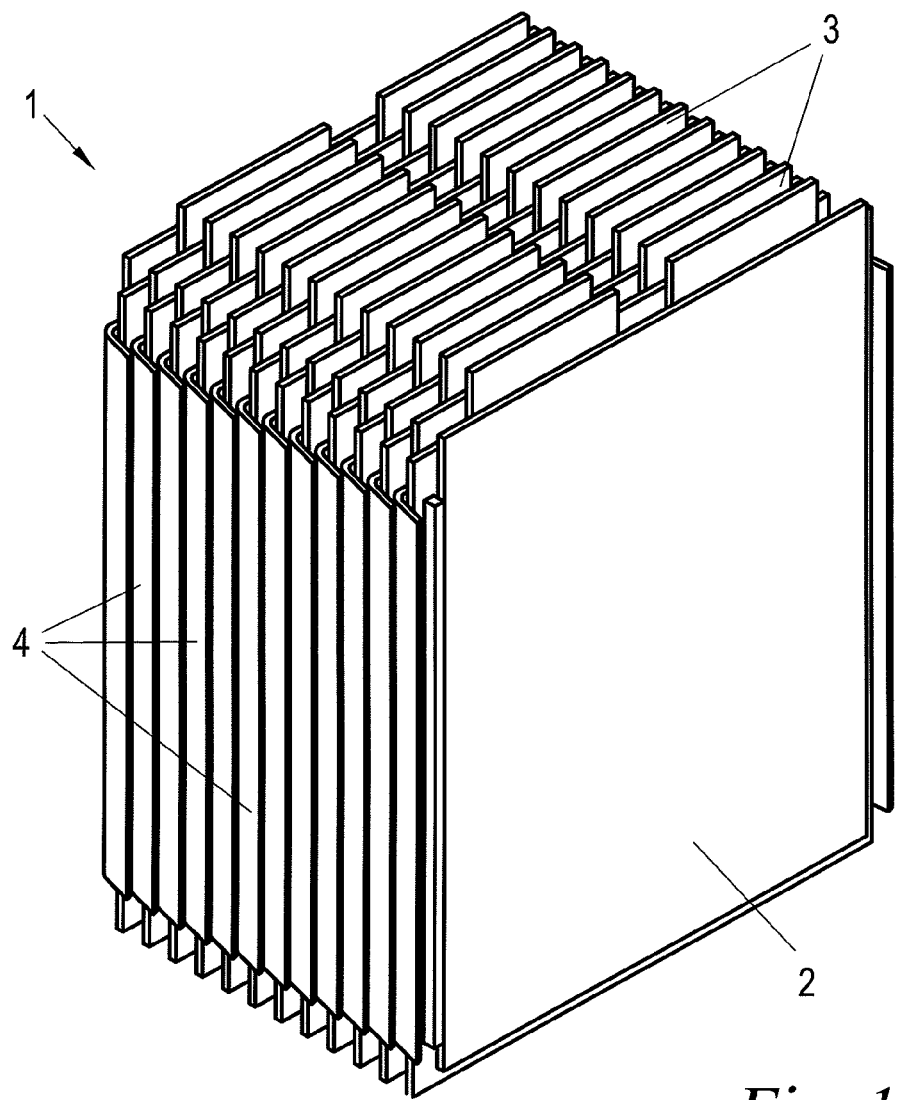
FIG. 1 illustrates a perspective view of a battery unit in accordance with the invention having a cell stack.

FIG. 1 illustrates a battery unit 1 with a plurality or stack 2 of flat cells 3. Between adjacent cells 3 is a cooling sheet 4 composed of a metal material. The cells 3 can, for example, be Lithium-Ion cells, which are encapsulated in a plastic shrink-wrap and equipped with appropriate electrical connections.

Figure 3:
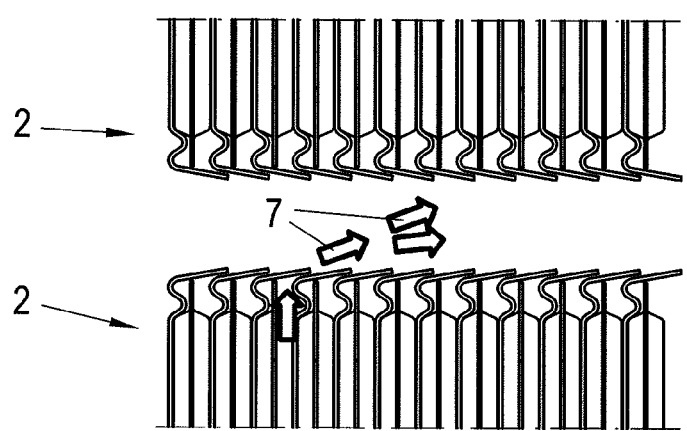
FIG. 3 illustrates a top view of the edges of a battery unit in accordance with the invention having two opposite stacks with multiple cell stacks.
Figure 2:
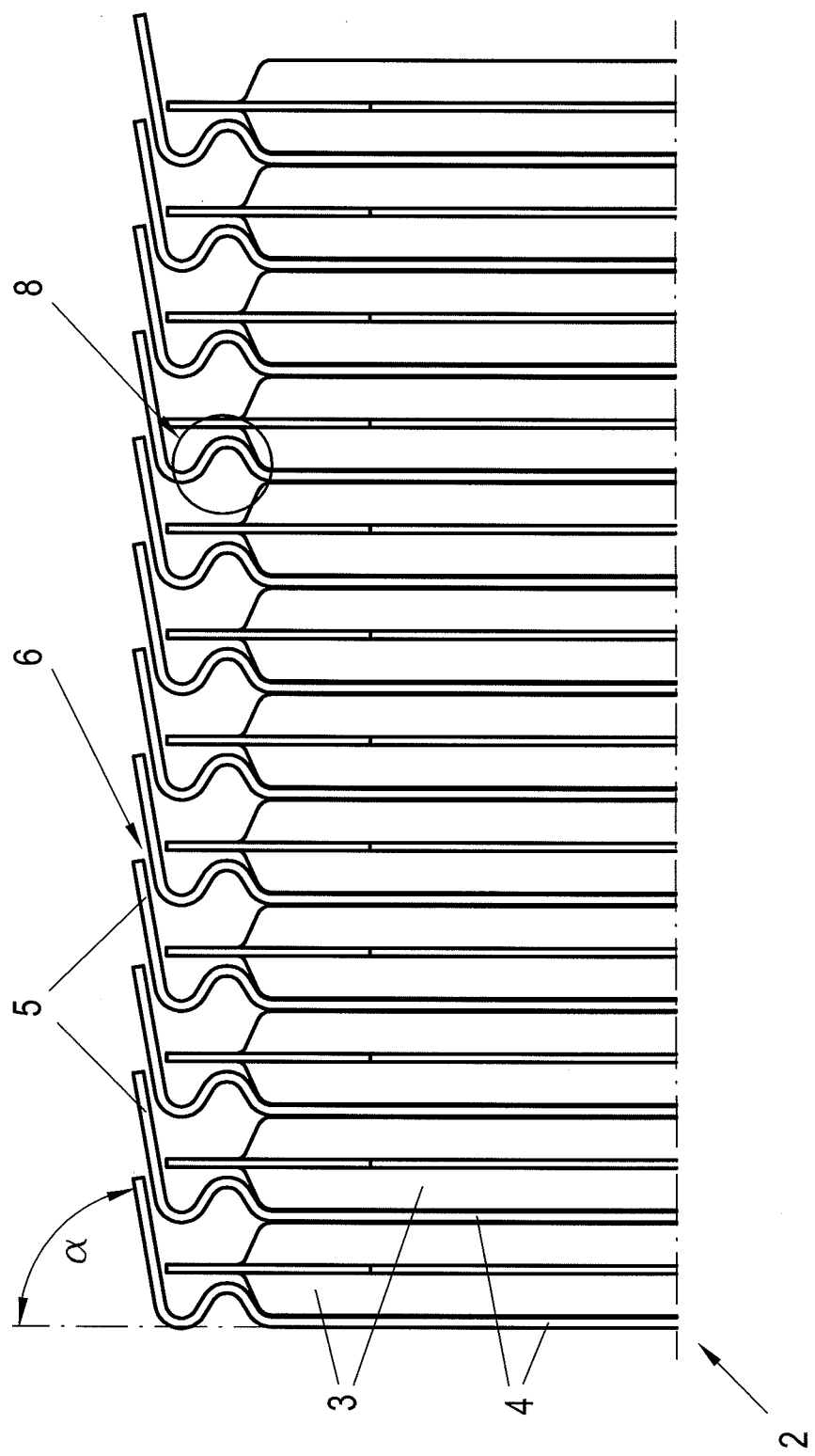
FIG. 2 illustrates a top view of the edge area of the cell stack depicted in FIG. 1.

As illustrated in FIG. 2, the cooling metal sheets 4 each have an angled edge 5 at an upper end thereof. The edges 5 of adjacent metal cooling sheets 4 are angled spatially in the same direction and partially overlap. As a result, the edges 5 form die gaps 6 in the overlapping areas, which redirect any gases or flames emanating from the cells 3 to a predetermined direction, e.g., laterally or the side. In essence, the gases or flames are directed away from adjacent and opposite cells (see arrows 7 in FIG. 3).

The angle $\alpha$ formed between the metal sheets and their bent edges 5 is preferably greater than or equal to 45 degrees, but in any case is less than 90 degrees, in order to create the die gaps 6. Preferably, the angle $\alpha$ is between 70 degrees and 85 degrees, and ideally around 80 degrees.

In areas 8 that are directly adjacent to and spatially below the edges 5, the cooling plates 4 are curled in order to prevent the directly adjacent cells(s) from moving or otherwise sliding all the way to the edges 5.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A battery unit comprising:
    a plurality of cells arranged in a stacked order; and
    a cooling sheet provided between adjacent cells, the cooling sheet having at least one edge which is bent at a predetermined angle and configured such that the at least one edge of adjacent cooling sheets are aligned spatially in the same direction and partially overlap in order to form a gaps in the direction of the alignment.

2. The battery unit of claim 1, wherein the cooling sheet is composed of a metal material.

3. The battery unit of claim 1, wherein the predetermined angle is greater than or equal to 45 degrees.

4. The battery unit of claim 3, wherein the predetermined angle is less than 90 degrees.

5. The battery unit of claim 1, wherein the predetermined angle is in a range of between 70 degrees and 85 degrees.

6. A battery unit comprising:
a first plurality of cells arranged in a stacked order;
a second plurality of cells arranged in a stacked order and opposed to the first plurality of cells;
a first cooling sheet provided between adjacent ones of the first plurality of cells, the first cooling sheet having at least one first edge which is bent at a first predetermined angle and configured such that the at least one first edge of adjacent first cooling sheets are aligned spatially in the same direction and partially overlap in order to form a first gap in the direction of the alignment; and
a second cooling sheet provided between adjacent ones of the second plurality of cells, the second cooling sheet having at least one second edge which is bent at a second predetermined angle and configured such that the at least one second edge of adjacent second cooling sheets are aligned spatially in the same direction and partially overlap in order to form a second gap in the direction of the alignment,
wherein the at least one first edge and the at least one second edge are bent in the same direction.

7. The battery unit of claim 6, wherein the first cooling sheet is composed of a metal material.

8. The battery unit of claim 6, wherein the first cooling sheet is composed of a metal material.

9. The battery unit of claim 6, wherein the first cooling sheet and the second cooling sheet are composed of the same material.

10. The battery unit of claim 9, wherein the first cooling sheet and the second cooling sheet are composed of a metal material.

11. The battery unit of claim 1, wherein:
the first predetermined angle is greater than or equal to 45 degrees; and
the second predetermined angle is greater than or equal to 45 degrees.

12. The battery unit of claim 11, wherein the first predetermined angle and the second predetermined angle is less than 90 degrees.

13. The battery unit of claim 6, wherein:
the first predetermined angle is in a range of between 70 degrees and 85 degrees; and
the second predetermined angle is in a range of between 70 degrees and 85 degrees.

14. The battery unit of claim 6, wherein the first predetermined angle is the same as the second predetermined angle.

15. A battery unit comprising:
a plurality of cells spaced from each other; and
a cooling sheet provided in the space between adjacent cells, the cooling sheet having a first section at a base portion thereof, a second area at an distal portion thereof, and a third section between the first section and the second section,
wherein:
the second section is bent at a predetermined angle relative to the first section such that the second section of adjacent cooling sheets are aligned spatially in the same direction and partially overlap to define a flow path; and
the third section is curled relative to the first section to thereby prevent a cell adjacent to one of cooling sheets from slipping towards the second section.

16. The battery unit of claim 15, wherein the cooling sheet is composed of a metal material.

17. The battery unit of claim 15, wherein the predetermined angle is greater than or equal to 45 degrees.

18. The battery unit of claim 17, wherein the predetermined angle is less than 90 degrees.

19. The battery unit of claim 15, wherein the predetermined angle is in a range of between 70 degrees and 85 degrees.

20. The battery unit of claim 15, wherein the flow path directs at least gases away from the cells.

* * * * *